(12) United States Patent
Dawkins et al.

(10) Patent No.: US 11,876,730 B2
(45) Date of Patent: Jan. 16, 2024

(54) METHOD AND APPARATUS FOR USING HIGH AVAILABILITY CONTROLLER WITH LOCAL AREA NETWORK (LAN) FOR LOCAL CLOUD

(71) Applicant: TENCENT AMERICA LLC, Palo Alto, CA (US)

(72) Inventors: Paul Spencer Dawkins, Garland, TX (US); Rohit Abhishek, Palo Alto, CA (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/976,451

(22) Filed: Oct. 28, 2022

(65) Prior Publication Data
US 2023/0171204 A1 Jun. 1, 2023

Related U.S. Application Data

(60) Provisional application No. 63/284,529, filed on Nov. 30, 2021.

(51) Int. Cl.
*H04L 47/783* (2022.01)
*H04L 47/70* (2022.01)
*H04L 47/762* (2022.01)

(52) U.S. Cl.
CPC .......... *H04L 47/783* (2013.01); *H04L 47/762* (2013.01); *H04L 47/822* (2013.01); *H04L 47/827* (2013.01)

(58) Field of Classification Search
CPC ... H04L 47/783; H04L 47/762; H04L 47/822; H04L 47/827
See application file for complete search history.

(56) References Cited

U.S. PATENT DOCUMENTS

| | | | | |
|---|---|---|---|---|
| 7,639,663 B1 * | 12/2009 | Nerses | ................... | H04L 47/24 370/347 |
| 8,089,872 B2 | 1/2012 | Balasaygun et al. | | |

(Continued)

OTHER PUBLICATIONS

International Search Report dated Feb. 22, 2023 in Application No. PCT/US22/48605.

(Continued)

*Primary Examiner* — Michael Won
(74) *Attorney, Agent, or Firm* — Sughrue Mion, PLLC

(57) ABSTRACT

A method performed by a network node connected to one or more additional network nodes, the network node and the one or more additional network nodes forming a cloud. The method including setting a first timer to a first value, the first timer associated with determining whether another network node from the one or more additional network nodes is an active controller in the cloud. The method further includes determining, before the first timer expires, whether a first message that indicates that another network node from the one or more additional network nodes is the active controller is received. The method further includes based on determining the first message is received before the first timer expires, restarting the first timer. The method further includes, based on determining the first message is not received before the first timer expires, assigning one or more tasks to at least one network node.

20 Claims, 5 Drawing Sheets

(56) References Cited

U.S. PATENT DOCUMENTS

| | | | |
|---|---|---|---|
| 10,761,520 B1 | 9/2020 | Boone et al. | |
| 11,144,358 B1 | 10/2021 | Noble et al. | |
| 2006/0198346 A1* | 9/2006 | Liu | H04W 40/24 |
| | | | 370/254 |
| 2015/0195162 A1* | 7/2015 | Gandham | H04L 43/067 |
| | | | 709/206 |
| 2019/0082004 A1* | 3/2019 | Bosch | H04L 67/10 |
| 2020/0244728 A1* | 7/2020 | Jha | G06F 21/10 |
| 2022/0060498 A1* | 2/2022 | Head, Jr. | H04L 12/4641 |

OTHER PUBLICATIONS

Written Opinion of the International Searching Authority dated Feb. 22, 2023 in Application No. PCT/US22/48605.

\* cited by examiner

_METHOD AND APPARATUS FOR USING HIGH AVAILABILITY CONTROLLER WITH LOCAL AREA NETWORK (LAN) FOR LOCAL CLOUD_

CROSS-REFERENCE TO RELATED APPLICATION

This application is based on and claims priority to U.S. Provisional Patent Application No. 63/284,529, filed on Nov. 30, 2021, the disclosure of which is incorporated by reference herein in its entirety.

TECHNICAL FIELD

The disclosed subject matter relates to methods and systems for creating a local cloud comprising of multiple devices which may be used as a high availability service for an edge cloud.

BACKGROUND

Cloud computing may be defined to be an on-demand access, via internet, to computing resources, applications, servers, data storage, development tools, networking capabilities. Cloud computer services may be hosted at a remote data center managed by a cloud services provider (CSP). Cloud computing may be a subscription-based service, where a cloud-based subscription helps to lower the resource cost by cutting down the purchase, installment, etc., cost. Cloud computing improves the agility and time-to-value, and may be scaled more easily in a cost-effective manner.

Currently, applications are more focused on concepts of internet of things (IoT), Artificial Intelligence (AI), Machine learning (Ml), Immersive Media. Furthermore, there is an exponential growth in the number of internet devices. Performing computation at data centers or cloud servers (potentially at a geographically distant location) may not be an efficient approach since these computations require significant bandwidth to move the data from the user to the cloud or data center and back, and also adds latency.

Edge computing brings the computing power closer to the users by placing the resources at the network edge, thereby reducing the network delay, reducing bandwidth requirement to an upper cloud, and enhancing reliability and cost reduction. Edge computing enables the computation of data closer to the user instead of travelling a farther distance going through multiple hops and relying on the cloud network.

The main benefit that network operators see in the use of edge computing is real-time dynamic computing being closer to the users, thereby reducing latency; cost reduction since users place less load on cloud servers; and higher quality of experience (QoE) since the local clouds are closer to the user, hence faster traffic delivery.

For immersive technologies like Lightfield, Augmented Reality (AR), and Virtual Reality (VR), a high-end hardware device is required. This requirement arises because these applications are likely to require a huge amount of processing power and storage to give the user the feeling of being in a truly immersive environment. Furthermore, these applications require real-time video stream processing to recognize specific objects, and some applications may even require generation of new video frames.

Therefore, the current challenges in using immersive technologies include the processing capacity, storage capacity, energy consumption, and weight of the device. All of these challenges are becoming more prominent due to the massive processing requirement of the applications running on the device. For immersive technologies which require users to wear a headset, heavy devices result in the user having an uncomfortable experience, and high processing capacity makes the device expensive including lightfield devices, which rely heavily on GPUs to meet the application's requirements. With limited resource availability at the device, processing tasks that require more than available resources would add computational latencies, and if a device is battery-powered, adding computational load exhausts the device's battery more quickly and shortens the service interval time between charges. Therefore, there exists a gap between the capabilities of the current state of the art and the requirements for future devices and systems.

If a device used for immersive technologies exists in isolation, the device itself must provide all the resources necessary to provide an acceptable QoE to the device's user. If the device is connected to other devices using a LAN, the device may request assistance from other devices on the LAN, using shared resources that are highly local to the device requesting assistance.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for creating a local cloud comprising of multiple devices which may be used as a high availability service for an edge cloud are disclosed by the present disclosure.

According to an exemplary embodiment, a method is performed by at least one processor of a network node that is connected to one or more additional network nodes via a local area network (LAN), the network node and the one or more additional network nodes forming a cloud. The method includes setting a first timer to a first value, the first timer associated with determining whether another network node from the one or more additional network nodes is an active controller in the cloud. The method further includes starting the first timer. The method further includes determining, before the first timer expires, whether a first message that indicates that another network node from the one or more additional network nodes is the active controller is received. The method further includes, based on determining the first message is received before the first timer expires, restarting the first timer. The method further includes, based on determining the first message is not received before the first timer expires, assigning, as the active controller in the cloud, one or more tasks to at least one network node from the one or more additional network nodes.

According to an exemplary embodiment, an apparatus connected to one or more additional network nodes via a local area network (LAN), the apparatus and the one or more additional network nodes forming a cloud. The apparatus includes at least one memory configured to store computer program code, and at least one processor configured to access the computer program code and operate as instructed by the computer program code. The computer program code includes first setting code configured to cause the at least one processor to set a first timer to a first value, the first timer associated with determining whether another network node from the one or more additional network nodes is an active controller in the cloud. The computer program code further includes first starting code configured to cause the at least one processor to start the first timer. The computer program code further includes first determining code configured to cause the at least one processor to determine, before the first timer expires, whether a first message that indicates that another network node from the one or more additional network nodes is the active controller is received. The computer program code further includes restarting code configured to cause the at least one processor to restart the first timer based on determining the first message is received before the first timer expires. The computer program code further includes first assigning code configured to cause the at least one processor to assign, as the active controller in the cloud based on determining the first message is not received before the first timer expires, one or more tasks to at least one network node from the one or more additional network nodes.

According to an exemplary embodiment, a non-transitory computer readable medium having instructions stored therein, which when executed by a processor of a network node that is connected to one or more additional network nodes via a local area network (LAN), the network node and the one or more additional network nodes forming a cloud, cause the processor to execute a method including setting a first timer to a first value, the first timer associated with determining whether another network node from the one or more additional network nodes is an active controller in the cloud. The method further includes starting the first timer and determining, before the first timer expires, whether a first message that indicates that another network node from the one or more additional network nodes is the active controller is received. The method further includes, based on determining the first message is received before the first timer expires, restarting the first timer. The method further includes based on determining the first message is not received before the first timer expires, assigning, as the active controller in the cloud, one or more tasks to at least one network node from the one or more additional network nodes.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects will be apparent from the following description of various embodiments taken in conjunction with the accompanying drawings, in which.

DETAILED DESCRIPTION

Figure 1:
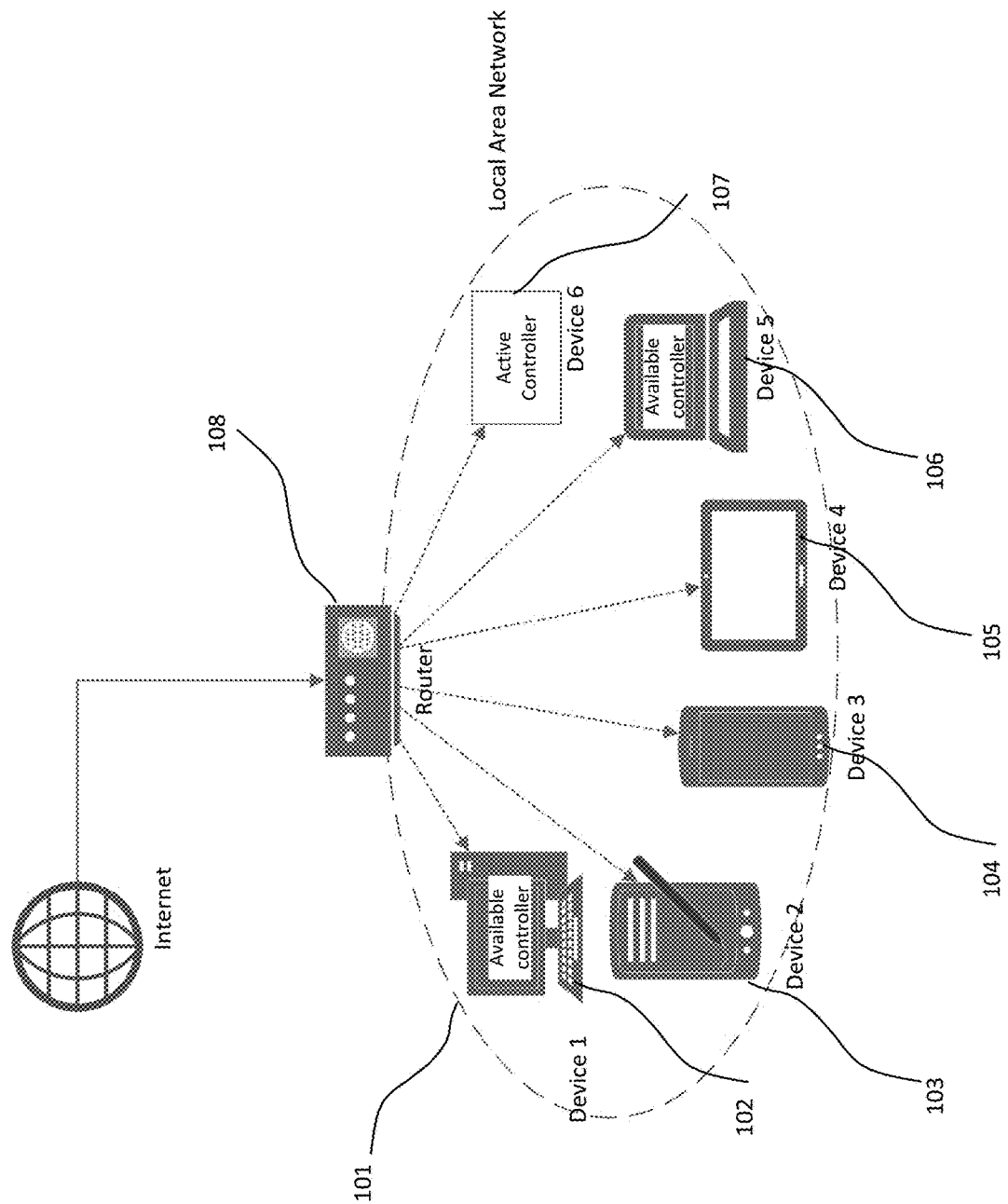
FIG. 1 is a diagram of a LAN including active and available controllers, in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure solve the problem of using devices connected to a LAN as a high availability service for an edge cloud that shares the processing capacity of those devices. Embodiments of the present disclosure include a method and apparatus applicable for any LAN that (i) includes devices that are used for technologies that require high computational resources, including immersive technologies, but may not have sufficient resources to carry out all required computational tasks for these technologies on their own, (ii) includes devices that have sufficient resources to offer some resources to a local cloud, in order to use these shared resources when necessary, and (iii) includes at least two devices that are willing to act as local cloud controllers.

In this disclosure, the term "device" may refer to all devices connected to the LAN with the ability to access resources available from the local cloud. The term "active controller" may refer to any device that identifies resources available to the local cloud and assigns tasks on behalf of devices. The term "worker" may refer to any device that is performing tasks as assigned by the active controller.

FIG. 1 illustrates an embodiment of a LAN network, where 108 is the gateway router for the LAN 101, and devices 102, 103, 104, 105, 106, and 107 are the different devices connected to the network. In some embodiments, resources from multiple devices connected to the LAN 101 may be used to create a local cloud. The setup may include any device in the LAN acting as active controller 107, which would be responsible for enlisting other devices within the LAN, and manage task assignment to those devices. "Managing task assignment" includes task migration between workers within the local cloud.

Various embodiments may be utilized for assigning the active controller for servicing requests and providing a highly available local cloud service. In FIG. 1, Device 6 (107) is serving as the active controller, but Device 1 (102) and Device 4 (106) may also be available to serve as the active controller if the current active controller becomes unresponsive.

Figure 2:
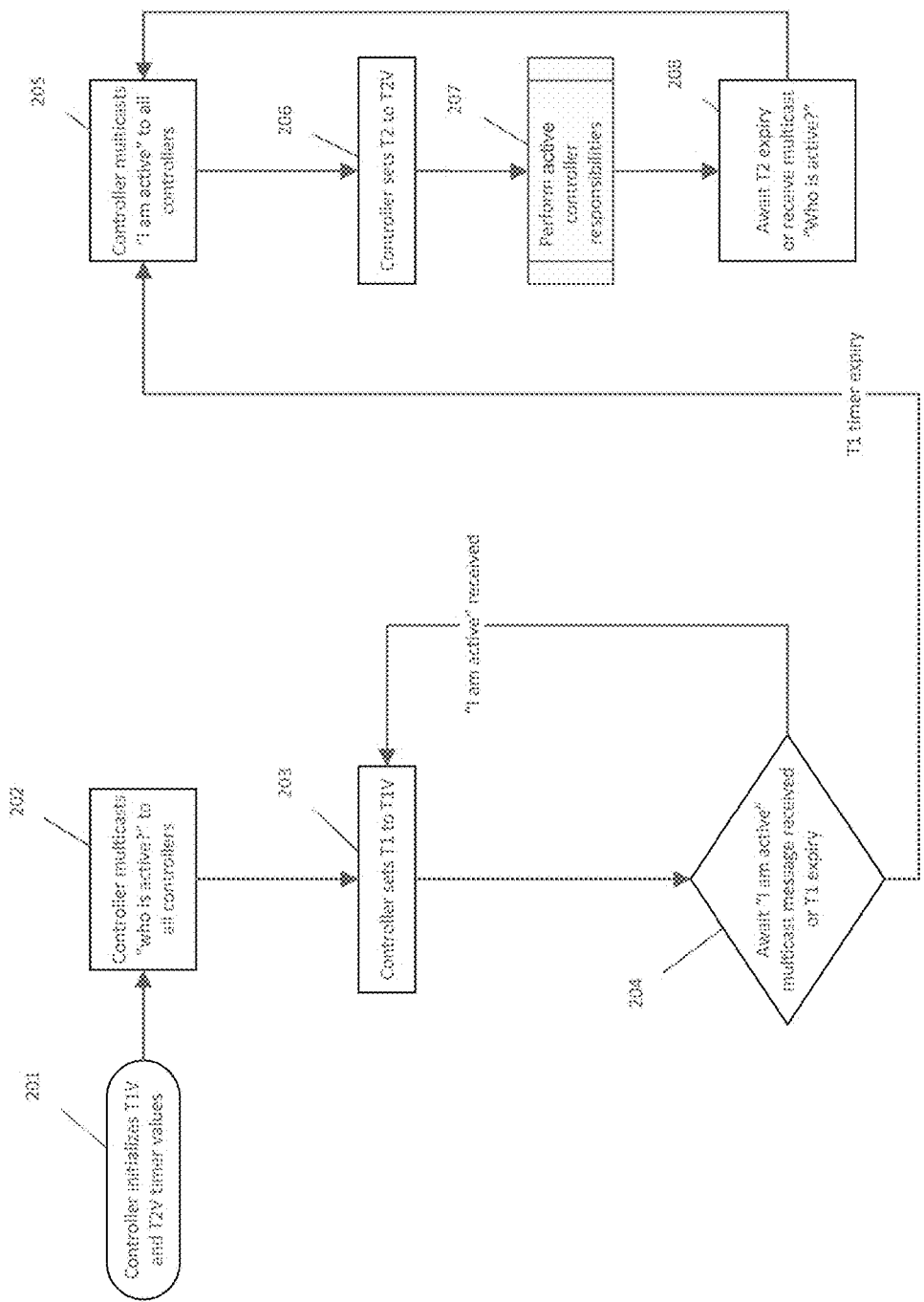
FIG. 2 is diagram of a controller-controller communication process, in accordance with various embodiments of the present disclosure.

FIG. 2 illustrates a flowchart of an embodiment of a process by which an available controller participates in a high-availability active controller selection process. The process may start at operation 201 where an available controller (201) initializes two timers to two timer values, T1V and T2V, respectively. For examples, the timers may be a T1 timer and a T2 timer. In some embodiments, the two timer values, T1V and T2V, may be predetermined. The timer values, T1V and T2V, may be used to limit the amount of time that no controller is active, if at least one controller is available. Timer value T1V may correspond to the amount of time that an available controller will wait for an indication that another controller is already active. Timer value T2V may correspond to the amount of time that an active controller will wait before sending an indication that it is already the active controller. In some embodiments, timer value T1V is longer than the timer value T2V. The timer values of T1V and T2V, and the ratio between T1V and T2V may be provisioned, may be determined experimentally, or may be determined adaptively. In some embodiments, a 3:1 ratio between the timer value T1V and the timer value T2V allows an available controller to receive at least two "I am active" messages, unless the previously active controller is no longer active, in which case the available controller may assume the role of an active controller.

In some embodiments, in order to avoid synchronization between available controllers that might all declare themselves active simultaneously (for example, after all of the devices on the LAN are powered on at the same time), each available controller may add a small randomly selected time interval to the T1 timer after setting the T1 timer to T1V. In some embodiments, the device that announces itself first as the available controller may have priority to become the active controller.

The process proceeds from operation 201 to operation 202 where the available controller sends a "who is active?" message to the "all controllers" multicast group. At operation 203, the available controller sets the T1 timer to T1V. At operation 204, the available controller waits for either an "I am active" multicast message to arrive from a currently active controller, or the T1 timer to expire. If the "I am active" message is received, which indicates that the LAN already has an active controller, the process returns from operation 204 to operation 203 to reset the T1 timer to T1V. If the T1 timer is expired, which indicates the LAN does not include an active controller, the process proceeds from operation 204 to operation 205.

At operation 205, the available controller multicasts an "I am active" message to all controllers to become the active controller. At operation 206, the active controller sets the T2 timer to T2V (206). At operation 207, the active controller performs the responsibilities of an active controller as described in FIG. 3 and FIG. 4. At operation 208, the active controller waits for either a "who is active?" multicast message to arrive from a currently active controller, or the T2 timer to expire. If either one of these conditions are met, the process returns to operation 205. While waiting, the active controller may also receive requests for local cloud resources and identifying workers with resources to satisfy those requests. Regardless of whether the active controller is awakened by the reception of a "who is active?" multicast message or the expiration of the T2 timer, the active controller sends a multicast "I am active" message to all available controllers at operation 205, sets the T2 timer to T2V at operation 206, and then waits as before at operation 207. Once an available controller becomes the active controller, this controller may continue to operate as the active controller for an indefinite period of time.

Figure 3:
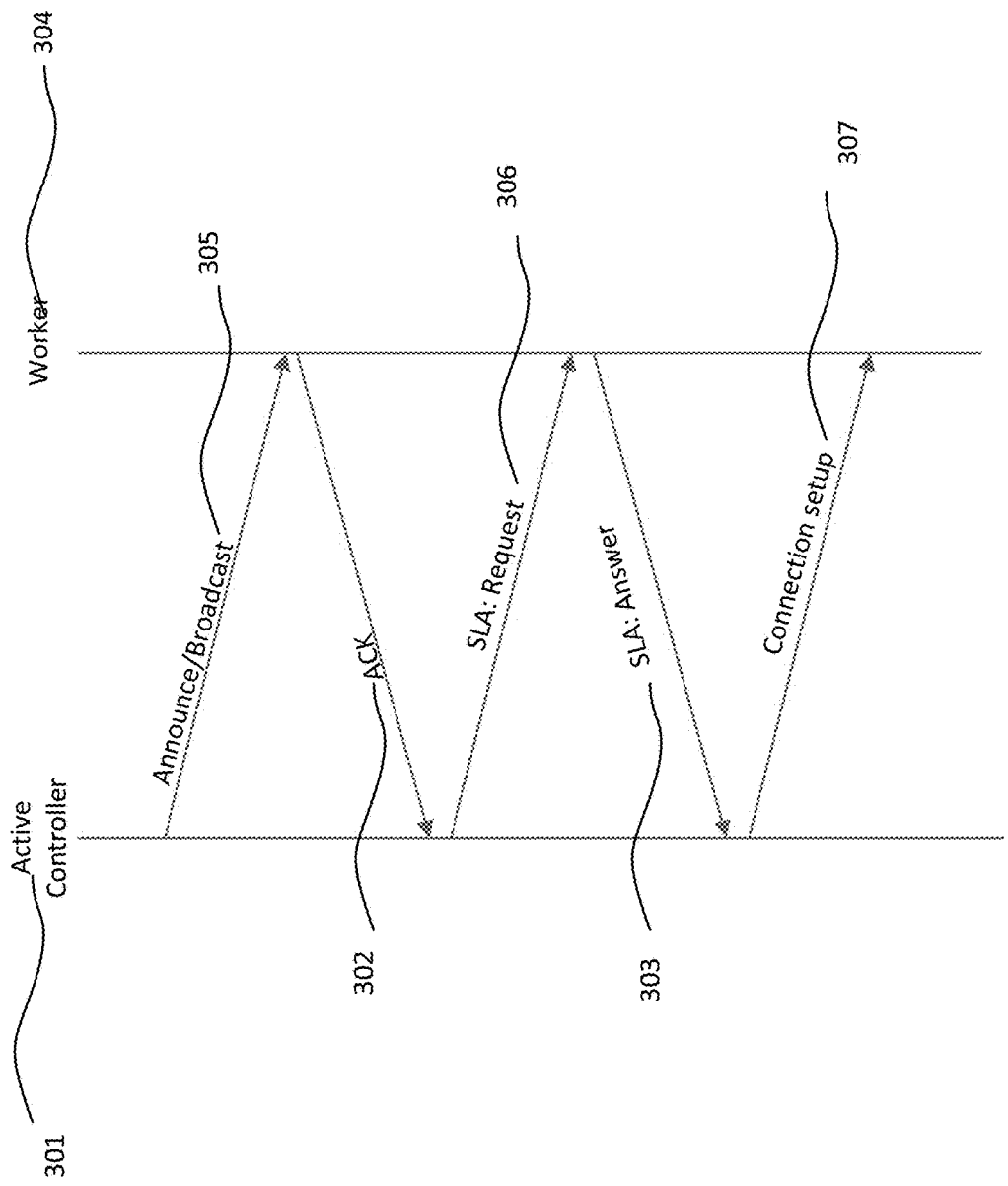
FIG. 3 is a diagram of an active controller-worker connection setup, in accordance with various embodiments of the present disclosure.

FIG. 3 illustrates an embodiment of the active controller 301—worker 304 connection setup. When a request for local cloud comes, the active controller 301 may broadcast messages to discover workers 304 connected to the LAN. If a device agrees to provide resources to the local cloud, the device may send an acknowledgement 302 to the active controller. The active controller may then respond with the SLA request 306, which may include requests for the worker to share the worker's resources including the resource availability time and the power availability. If the worker agrees, the worker may send an SLA answer 303, after which the active controller may setup the connection 307. The worker may also need to share information such as a number of active apps on the worker and the energy consumption of the worker. The worker may also be required to share such information during the session.

Figure 4:
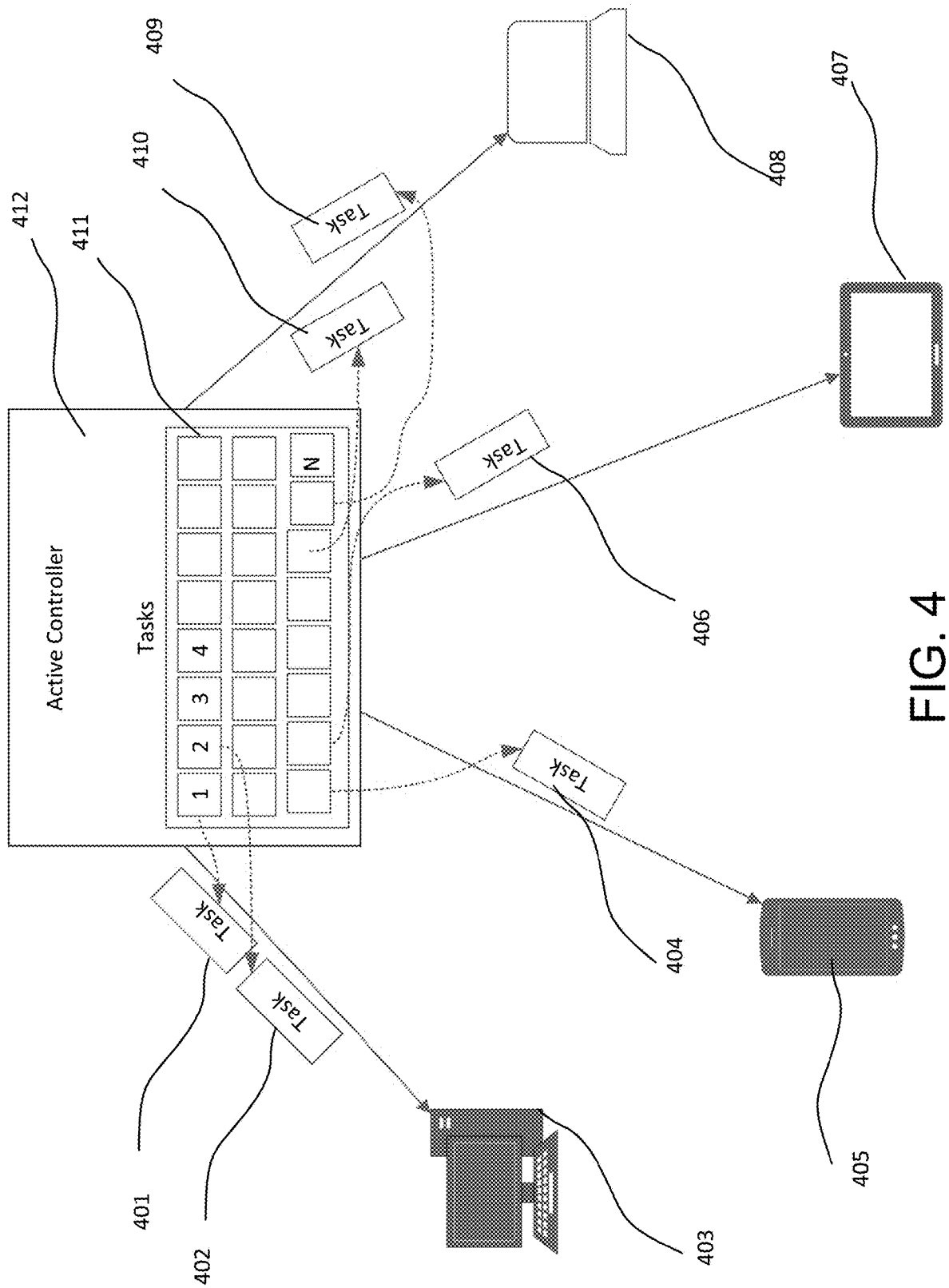
FIG. 4 is a diagram of an active controller-worker task assignment, in accordance with various embodiments of the present disclosure.

After the active controller receives the SLA answer from the worker, the active controller may start assigning tasks to the various workers. FIG. 4 illustrates an embodiment of the active controller-worker task assignment. The tasks 411 may correspond to one or more tasks the active controller 412 needs to assign to the workers 403, 405, 407, and 408. The active controller may divide the one or more tasks into sub-tasks 401, 402, 404, 406, 409, and 410.

In some embodiments, the active controller may use the worker's resource availability (e.g., storage the worker is willing to lease, the total storage capacity of the worker, power availability of the worker, etc.) to assign tasks. In some embodiments, a worker may notify the active controller to update the worker's willingness to provide resources for various reasons, including but not limited to unrelated local computation using some of the worker's resources.

In some embodiments, if due to some reason the worker no longer wants to be used, the worker may notify the active controller of this change in participation. The worker may not disconnect right away. Instead, the active controller may check if there is any active task running on the worker. The worker may choose to finish the current task before disconnecting or may wait for the active controller to migrate the task to some other worker in the network. In case the worker disconnects due to network issues or any other issues, the active controller may reassign the task allocated to the disconnected worker to some other worker in the network.

In some embodiments, if the active controller becomes unresponsive and another controller is available, a new active controller may be selected using process illustrated in FIG. 2. In some embodiments, a local cloud may be used as a subscription-based service where the owner of the LAN leases computing and storage resources in-return of payment. An example may be using the local cloud to storage images/files or performing some image processing tasks. The local area cloud may also be used to perform any task for any device within its network. For example, if any device in the network is streaming immersive media, and if the device does not have enough resources to process incoming media streams (decoding, stitching), the device may ask the active controller in the network to process the media on the device's behalf.

The methodology to use LAN as high availability service for edge cloud may be implemented as computer software using computer-readable instructions and physically stored in one or more computer-readable media. For example, FIG. 5 illustrates an embodiment of a computer system 500 suitable for implementing the embodiments of the present disclosure.

The computer software may be coded using any suitable machine code or computer language that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 5:
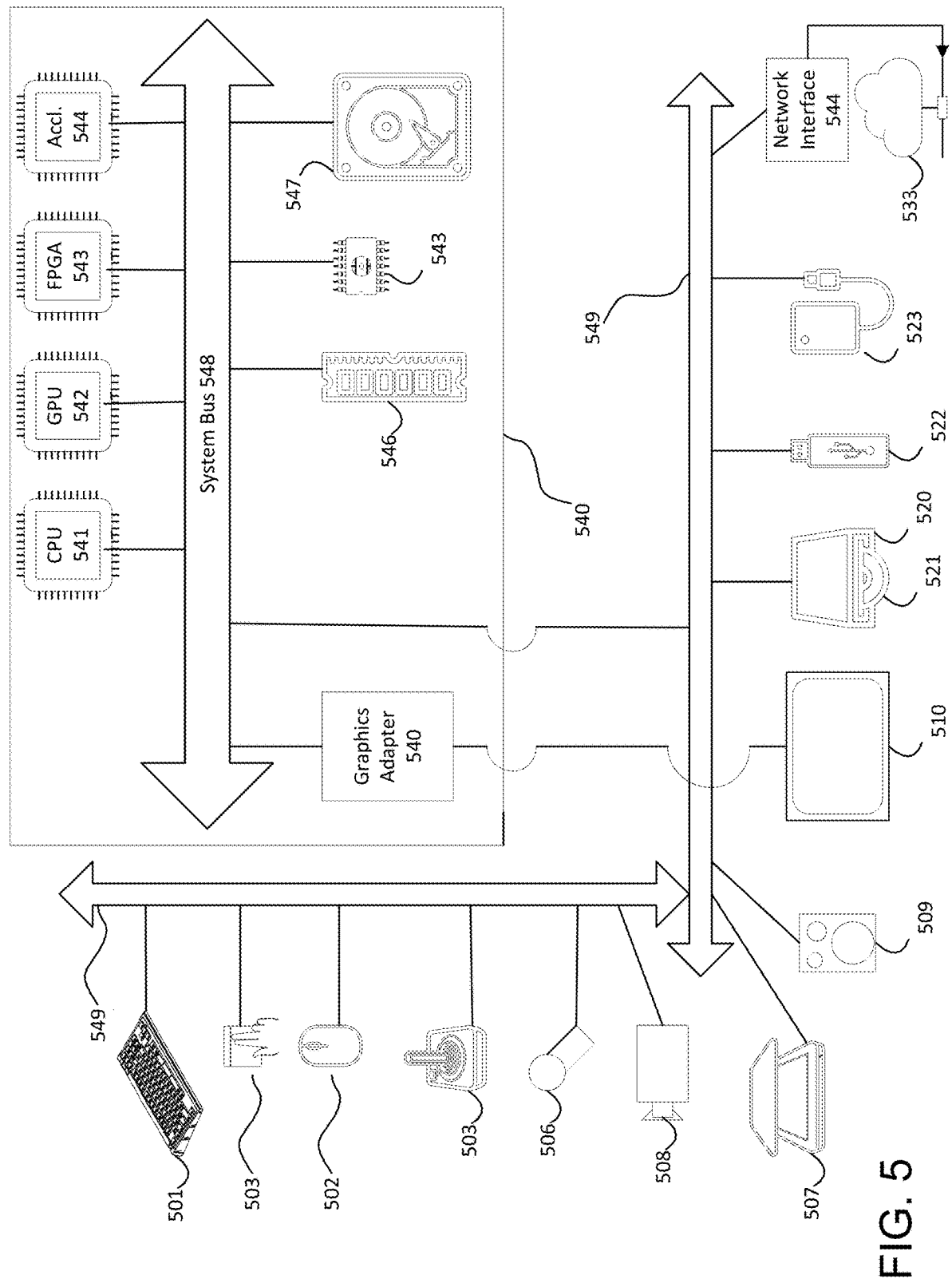
FIG. 5 is a schematic illustration of a computer system, in accordance with various embodiments of the present disclosure.

The components shown in FIG. 5 for computer system 500 are exemplary and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 500.

Computer system 500 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 501, mouse 502, trackpad 503, touch screen 510, data-glove (not depicted), joystick 505, microphone 506, scanner 507, camera 508.

Computer system 500 may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen 510, data-glove (not depicted), or joystick 505, but there may also be tactile feedback devices that do not serve as input devices), audio output devices (such as speakers 509, headphones (not depicted)), visual output devices (such as screens 510 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted). Computer system 500 may also include human accessible storage devices and their associated media such as optical media including CD/DVD ROM/RW Z20 with CD/DVD or the like media 521, thumb-drive 522, removable hard drive or solid-state drive 523, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 500 may also include an interface to one or more communication networks. Networks may, for example, be wireless, wireline, optical. Networks may further be local, wide-area, metropolitan, vehicular, and industrial, real-time, delay-tolerant, and so on. Examples of networks include LANs such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that are attached to certain general-purpose data ports or peripheral buses (549) (such as, for example, USB ports of the computer system 500; others are commonly integrated into the core of the computer system 500 by attachment to a system bus as described below (for example Ethernet interface into a PC computer system or cellular network interface into a smartphone computer system). Using any of these networks, the computer system 500 may communicate with other entities. Such communication may be uni-directional, receive only (for example, broadcast TV), uni-directional send-only (for example, CANbus to certain CANbus devices), or bi-directional, for example, to other computer systems using local or wide area digital networks. Certain protocols and protocol stacks may be used on each of those networks and network interfaces, as described above.

The aforementioned human interface devices, human-accessible storage devices, and network interfaces may be attached to a core 540 of the computer system 500.

The core 540 may include one or more Central Processing Units (CPU) 541, Graphics Processing Units (GPU) 542, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, may be connected through a system bus 548. In some computer systems, the system bus 548 may be accessible in the form of one or more physical plugs to enable extensions by additional CPUs, GPU, and the like. The peripheral devices may be attached either directly to the core's system bus 548 or through a peripheral bus 549. Architectures for a peripheral bus include PCI, USB, and the like.

CPUs 541, GPUs 542, FPGAs 543, and accelerators 544 may execute certain instructions that, in combination, may make up the aforementioned computer code. That computer code may be stored in ROM 545 or RAM 546. Transitional data may also be stored in RAM 546, whereas permanent data may be stored, for example, in the internal mass storage 547. Fast storage and retrieval to any of the memory devices may be enabled through the use of cache memory, which may be closely associated with one or more CPU 541, GPU 542, mass storage 547, ROM 545, RAM 546, and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example, and not by way of limitation, the computer system having architecture 500, and specifically the core 540, may provide functionality as a result of processor (s) (including CPUs, GPUs, FPGA, accelerators, and the like) executing software embodied in one or more tangible, computer-readable media. Such computer-readable media may be media associated with user-accessible mass storage as introduced above, as well as certain storage of the core 540 that are of non-transitory nature, such as core-internal mass storage 547 or ROM 545. The software implementing various embodiments of the present disclosure may be stored in such devices and executed by core 540. A computer-readable medium may include one or more memory devices or chips, according to particular needs. The software may cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition, or as an alternative, the computer system may provide functionality as a result of logic hardwired or otherwise embodied in a circuit (for example, accelerator 544), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor of a network node that is connected to one or more additional network nodes via a local area network (LAN), the network node and the one or more additional network nodes forming a cloud, the method including: setting a first timer to a first value, the first timer associated with determining whether another network node from the one or more additional network nodes is an active controller in the cloud; starting the first timer; determining, before the first timer expires, whether a first message that indicates that another network node from the one or more additional network nodes is the active controller is received; based on determining the first message is received before the first timer expires, restarting the first timer; and based on determining the first message is not received before the first timer expires, assigning, as the active controller in the cloud, one or more tasks to at least one network node from the one or more additional network nodes.

(2) The method according to feature (1), further including: setting a second timer to a second value; based on determining the first message is not received before the first timer expires, starting the second timer; based on expiration of the second timer or receiving a third message from another network node in the plurality of network nodes requesting identification of the active controller, broadcasting, to each network node from the one or more additional network nodes, a second message indicating that the network node is the active controller in the cloud.

(3) The method according to feature (2), in which the first timer is longer than the second timer.

(4) The method according to any one of features (1)-(3), further including: while the network node is the active controller: broadcasting a fourth message to each network node from the one or more additional network nodes to discover an available controller, and receiving, from an available network node from the one or more additional network nodes based on the fourth message, a fifth message indicating the available network node is an available controller.

(5) The method according to feature (4), further including: based on receiving the fifth message: sending a sixth message to the available network node requesting the available network node to specify one or more resources of the available network node; receiving, based on the sixth message, a seventh message that specifies at least one resource of the one or more resources of the available network node; based on receiving the sixth message, assigning one or more tasks to the available network node based on the at least one resource.

(6) The method according to feature (5), further including: receiving a seventh message from the available network node indicating the available network node is no longer the available controller; based on receiving the seventh message, determining if the available network node is assigned one or more tasks that are not completed.

(7) The method according to feature (6), further including: based on determining the available network node is assigned one or more tasks that are not completed, waiting for the available network node to complete the one or more tasks before disconnecting with the available network node.

(8) The method according to feature (6), further including: based on determining the available network node is assigned one or more tasks that are not completed, migrating the one or more tasks to another available network node from the one or more additional network nodes.

(9) An apparatus connected to one or more additional network nodes via a local area network (LAN), the apparatus and the one or more additional network nodes forming a cloud, the apparatus including: at least one memory configured to store computer program code; and at least one processor configured to access the computer program code and operate as instructed by the computer program code, the computer program code including: first setting code configured to cause the at least one processor to set a first timer to a first value, the first timer associated with determining whether another network node from the one or more additional network nodes is an active controller in the cloud, first starting code configured to cause the at least one processor to start the first timer, first determining code configured to cause the at least one processor to determine, before the first timer expires, whether a first message that indicates that another network node from the one or more additional network nodes is the active controller is received, restarting code configured to cause the at least one processor to restart the first timer based on determining the first message is received before the first timer expires, and first assigning code configured to cause the at least one processor to assign, as the active controller in the cloud based on determining the first message is not received before the first timer expires, one or more tasks to at least one network node from the one or more additional network nodes.

(10) The apparatus according to feature (9), in which the computer program code further includes: second setting code configured to cause the at least one processor to set a second timer to a second value, second starting code configured to cause the at least one processor to start the second timer based on determining the first message is not received before the first timer expires, first broadcasting code configured to cause the at least one processor to broadcast, to each network node from the one or more additional network nodes based on expiration of the second timer or receiving a third message from another network node in the plurality of network nodes requesting identification of the active controller, a second message indicating that the network node is the active controller in the cloud.

(11) The apparatus according to feature (11), in which the first timer is longer than the second timer.

(12) The apparatus according to any one of features (9)-(11), in which the computer program code further includes: while the network node is the active controller: second broadcasting code configured to cause the at least one processor to broadcast a fourth message to each network node from the one or more additional network nodes to discover an available controller, and first receiving code configured to cause the at least one processor to receive, from an available network node from the one or more additional network nodes based on the fourth message, a fifth message indicating the available network node is an available controller.

(13) The apparatus according to feature (12), in which the computer program code further includes: based on receiving the fifth message: first sending code configured to cause the at least one processor to send a sixth message to the available network node requesting the available network node to specify one or more resources of the available network node, second receiving code configured to cause the at least one processor to receive, based on the sixth message, a seventh message that specifies at least one resource of the one or more resources of the available network node, second assigning code configured to cause the at least one processor to assign, based on receiving the sixth message, one or more tasks to the available network node based on the at least one resource.

(14) The apparatus according to feature (13), in which the computer program code further includes: second receiving code configured to cause the at least one processor to receive a seventh message from the available network node indicating the available network node is no longer the available controller; second determining code configured to cause the at least one processor to determine, based on receiving the seventh message, if the available network node is assigned one or more tasks that are not completed.

(15) The apparatus according to feature (14), the computer program code further including: waiting code configured to cause the at least one processor to wait, based on determining the available network node is assigned one or more tasks that are not completed, for the available network node to complete the one or more tasks before disconnecting with the available network node.

(16) The apparatus according to feature (15), in which the computer program code further includes: migrating code configured to cause the at least one processor to migrate, based on determining the available network node is assigned one or more tasks that are not completed, the one or more tasks to another available network node from the one or more additional network nodes.

(17) A non-transitory computer readable medium having instructions stored therein, which when executed by a processor of a network node that is connected to one or more additional network nodes via a local area network (LAN), the network node and the one or more additional network nodes forming a cloud, cause the processor to execute a method including: setting a first timer to a first value, the first timer associated with determining whether another network node from the one or more additional network nodes is an active controller in the cloud; starting the first timer; determining, before the first timer expires, whether a first message that indicates that another network node from the one or more additional network nodes is the active controller is received; based on determining the first message is received before the first timer expires, restarting the first timer; and based on determining the first message is not received before the first timer expires, assigning, as the active controller in the cloud, one or more tasks to at least one network node from the one or more additional network nodes.

(18) The non-transitory computer readable medium according to feature (17), further including: setting a second timer to a second value; based on determining the first message is not received before the first timer expires, starting the second timer; based on expiration of the second timer or receiving a third message from another network node in the plurality of network nodes requesting identification of the active controller, broadcasting, to each network node from the one or more additional network nodes, a second message indicating that the network node is the active controller in the cloud.

(19) The non-transitory computer readable medium according to feature (18), in which the first timer is longer than the second timer.

(20) The non-transitory computer readable medium according to any one of features (17)-(19), further including: while the network node is the active controller: broadcasting a fourth message to each network node from the one or more additional network nodes to discover an available controller, and receiving, from an available network node from the one or more additional network nodes based on the fourth message, a fifth message indicating the available network node is an available controller.

What is claimed is:

1. A method performed by at least one processor of a network node that is connected to one or more additional network nodes via a local area network (LAN), the network node and the one or more additional network nodes forming a cloud, the method comprising:
setting a first timer to a first value;
transmitting, to each of the one or more additional network nodes, a multicast message for determining whether another network node from the one or more additional network nodes is an active controller in the cloud;
starting the first timer after transmitting the multicast message;
determining, before the first timer expires, whether a first message in response to the multicast message that indicates that another network node from the one or more additional network nodes is the active controller is received;
based on determining the first message is received before the first timer expires, restarting the first timer; and
based on determining the first message is not received before the first timer expires, assigning, as the active controller in the cloud, one or more tasks to at least one network node from the one or more additional network nodes.

2. The method according to claim 1, further comprising:
setting a second timer to a second value;
based on determining the first message is not received before the first timer expires, starting the second timer;
based on expiration of the second timer or receiving a third message from another network node in the one or more additional network nodes requesting identification of the active controller, broadcasting, to each network node from the one or more additional network nodes, a second message indicating that the network node is the active controller in the cloud.

3. The method according to claim 2, wherein the first timer is longer than the second timer.

4. The method according to claim 1, further comprising:
while the network node is the active controller:
broadcasting a fourth message to each network node from the one or more additional network nodes to discover an available controller, and
receiving, from an available network node from the one or more additional network nodes based on the fourth message, a fifth message indicating the available network node is an available controller.

5. The method according to claim 4, further comprising: based on receiving the fifth message:
sending a sixth message to the available network node requesting the available network node to specify one or more resources of the available network node;
receiving, based on the sixth message, a seventh message that specifies at least one resource of the one or more resources of the available network node;
based on receiving the sixth message, assigning one or more tasks to the available network node based on the at least one resource.

6. The method according to claim 5, further comprising:
receiving an eighth message from the available network node indicating the available network node is no longer the available controller;
based on receiving the eighth message, determining if the available network node is assigned one or more tasks that are not completed.

7. The method according to claim 6, further comprising:
based on determining the available network node is assigned one or more tasks that are not completed, waiting for the available network node to complete the one or more tasks before disconnecting with the available network node.

8. The method according to claim 6, further comprising:
based on determining the available network node is assigned one or more tasks that are not completed, migrating the one or more tasks to another available network node from the one or more additional network nodes.

9. An apparatus connected to one or more additional network nodes via a local area network (LAN), the apparatus and the one or more additional network nodes forming a cloud, the apparatus comprising:

at least one memory configured to store computer program code; and at least one processor configured to access the computer program code and operate as instructed by the computer program code, the computer program code including:

first setting code configured to cause the at least one processor to set a first timer to a first value;

transmitting, to each of the one or more additional network nodes, a multicast message for determining whether another network node from the one or more additional network nodes is an active controller in the cloud, first starting code configured to cause the at least one processor to start the first timer after transmitting the multicast message, first determining code configured to cause the at least one processor to determine, before the first timer expires, whether a first message in response to the multicast message that indicates that another network node from the one or more additional network nodes is the active controller is received, restarting code configured to cause the at least one processor to restart the first timer based on determining the first message is received before the first timer expires, and first assigning code configured to cause the at least one processor to assign, as the active controller in the cloud based on determining the first message is not received before the first timer expires, one or more tasks to at least one network node from the one or more additional network nodes.

10. The apparatus according to claim 9, wherein the computer program code further includes:

second setting code configured to cause the at least one processor to set a second timer to a second value, second starting code configured to cause the at least one processor to start the second timer based on determining the first message is not received before the first timer expires, first broadcasting code configured to cause the at least one processor to broadcast, to each network node from the one or more additional network nodes based on expiration of the second timer or receiving a third message from another network node in the one or more additional network nodes requesting identification of the active controller, a second message indicating that the network node is the active controller in the cloud.

11. The apparatus according to claim 10, wherein the first timer is longer than the second timer.

12. The apparatus according to claim 9, wherein the computer program code further includes:

while the network node is the active controller:

second broadcasting code configured to cause the at least one processor to broadcast a fourth message to each network node from the one or more additional network nodes to discover an available controller, and first receiving code configured to cause the at least one processor to receive, from an available network node from the one or more additional network nodes based on the fourth message, a fifth message indicating the available network node is an available controller.

13. The apparatus according to claim 12, wherein the computer program code further includes:

based on receiving the fifth message:

first sending code configured to cause the at least one processor to send a sixth message to the available network node requesting the available network node to specify one or more resources of the available network node, second receiving code configured to cause the at least one processor to receive, based on the sixth message, a seventh message that specifies at least one resource of the one or more resources of the available network node, second assigning code configured to cause the at least one processor to assign, based on receiving the sixth message, one or more tasks to the available network node based on the at least one resource.

14. The apparatus according to claim 13, wherein the computer program code further includes:

third receiving code configured to cause the at least one processor to receive an eighth message from the available network node indicating the available network node is no longer the available controller;

second determining code configured to cause the at least one processor to determine, based on receiving the eighth message, if the available network node is assigned one or more tasks that are not completed.

15. The apparatus according to claim 14, the computer program code further including:

waiting code configured to cause the at least one processor to wait, based on determining the available network node is assigned one or more tasks that are not completed, for the available network node to complete the one or more tasks before disconnecting with the available network node.

16. The apparatus according to claim 15, wherein the computer program code further includes:

migrating code configured to cause the at least one processor to migrate, based on determining the available network node is assigned one or more tasks that are not completed, the one or more tasks to another available network node from the one or more additional network nodes.

17. A non-transitory computer readable medium having instructions stored therein, which when executed by a processor of a network node that is connected to one or more additional network nodes via a local area network (LAN), the network node and the one or more additional network nodes forming a cloud, cause the processor to execute a method comprising:

setting a first timer to a first value transmitting, to each of the one or more additional network nodes, a multicast message for determining whether another network node from the one or more additional network nodes is an active controller in the cloud;

starting the first timer after transmitting the multicast message;

determining, before the first timer expires, whether a first message in response to the multicast message that indicates that another network node from the one or more additional network nodes is the active controller is received;

based on determining the first message is received before the first timer expires, restarting the first timer; and based on determining the first message is not received before the first timer expires, assigning, as the active controller in the cloud, one or more tasks to at least one network node from the one or more additional network nodes.

18. The non-transitory computer readable medium according to claim 17, further comprising:

setting a second timer to a second value;

based on determining the first message is not received before the first timer expires, starting the second timer;

based on expiration of the second timer or receiving a third message from another network node in the one or more additional network nodes requesting identification of the active controller, broadcasting, to each network node from the one or more additional network nodes, a second message indicating that the network node is the active controller in the cloud.

19. The non-transitory computer readable medium according to claim 18, wherein the first timer is longer than the second timer.

20. The non-transitory computer readable medium according to claim 17, further comprising:

while the network node is the active controller:

broadcasting a fourth message to each network node from the one or more additional network nodes to discover an available controller, and receiving, from an available network node from the one or more additional network nodes based on the fourth message, a fifth message indicating the available network node is an available controller.

* * * * *